United States Patent
Morton et al.

(10) Patent No.: US 10,324,458 B2
(45) Date of Patent: Jun. 18, 2019

(54) AUTOMATED CREEL SYSTEMS AND METHODS FOR USING SAME

(71) Applicant: COLUMBIA INSURANCE COMPANY, Omaha, NE (US)

(72) Inventors: Bryan M. Morton, Dalton, GA (US); Zachary N. Hall, Cohutta, GA (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 0 days.

(21) Appl. No.: 15/644,174

(22) Filed: Jul. 7, 2017

(65) Prior Publication Data
US 2018/0011491 A1   Jan. 11, 2018

Related U.S. Application Data

(60) Provisional application No. 62/359,797, filed on Jul. 8, 2016.

(51) Int. Cl.
| | |
|---|---|
| *G05B 19/418* | (2006.01) |
| *D02H 1/00* | (2006.01) |
| *B65H 67/06* | (2006.01) |
| *G05D 1/00* | (2006.01) |
| *B65H 49/16* | (2006.01) |
| *B65H 67/02* | (2006.01) |
| *B25J 9/16* | (2006.01) |
| *B25J 19/02* | (2006.01) |

(Continued)

(52) U.S. Cl.
CPC ........ *G05B 19/41895* (2013.01); *B25J 5/007* (2013.01); *B25J 9/0093* (2013.01); *B25J 9/1679* (2013.01); *B25J 19/021* (2013.01); *B65H 49/16* (2013.01); *B65H 67/02* (2013.01); *B65H 67/064* (2013.01); *B65H 67/065* (2013.01); *G05D 1/0088* (2013.01); *B65H 2701/31* (2013.01); *D02H 1/00* (2013.01)

(58) Field of Classification Search
CPC ... D02H 1/00; G05B 19/41895; B65H 67/064
See application file for complete search history.

(56) References Cited

U.S. PATENT DOCUMENTS

| | | | | |
|---|---|---|---|---|
| 4,515,328 | A | * | 5/1985 | Payne, Jr. ............ B65H 67/064 198/487.1 |
| 4,669,942 | A | * | 6/1987 | Isao ..................... B65H 67/064 198/487.1 |
| 4,988,252 | A | | 1/1991 | Yamamoto et al. |

(Continued)

*Primary Examiner* — Thomas Randazzo
(74) *Attorney, Agent, or Firm* — Ballard Spahr LLP

(57) ABSTRACT

Systems and methods for loading and delivering stalk subassemblies and yarn packages are disclosed herein. Such systems and methods can have at least one processor, at least one automated guided vehicle, at least one creel assembly, and an automated creel loading assembly. The at least one automated guided vehicle can be communicatively coupled to the at least one processor. The at least one processor can be configured to selectively direct an automated guided vehicle to engage a respective stalk subassembly. Upon engagement between the automated guided vehicle and the stalk subassembly, the processor can be configured to selectively direct the automated guided vehicle to move about and between the selected operative position within the creel assembly and a loading position proximate the automated creel loading assembly.

18 Claims, 10 Drawing Sheets

(51) Int. Cl.
*B25J 5/00* (2006.01)
*B25J 9/00* (2006.01)

(56) References Cited

U.S. PATENT DOCUMENTS

| | | | | |
|---|---|---|---|---|
| 5,169,273 | A * | 12/1992 | Kawamura | B65H 67/065 |
| | | | | 198/426 |
| 5,207,547 | A * | 5/1993 | Kawamura | B65H 67/02 |
| | | | | 242/473.6 |
| 5,218,748 | A * | 6/1993 | Tanaka | B65H 67/06 |
| | | | | 242/131 |
| 5,979,817 | A | 11/1999 | Kim | |
| 6,260,783 | B1 * | 7/2001 | Realff | B65H 67/063 |
| | | | | 242/474 |
| 9,688,504 | B2 * | 6/2017 | Shirley, IV | B65H 63/04 |
| 2007/0293978 | A1 * | 12/2007 | Wurman | G05B 19/4189 |
| | | | | 700/213 |
| 2008/0173742 | A1 * | 7/2008 | Chadwick | B65H 49/16 |
| | | | | 242/130 |
| 2009/0101749 | A1 * | 4/2009 | Chadwick | B65H 49/16 |
| | | | | 242/551 |
| 2010/0090050 | A1 * | 4/2010 | Vaughan | B65H 49/16 |
| | | | | 242/131 |
| 2011/0127364 | A1 * | 6/2011 | Rees | B65H 49/16 |
| | | | | 242/594 |
| 2011/0308438 | A1 * | 12/2011 | Ingram, III | B65H 49/16 |
| | | | | 112/80.07 |
| 2014/0214234 | A1 * | 7/2014 | Worsley | G06Q 10/087 |
| | | | | 701/2 |
| 2015/0225203 | A1 * | 8/2015 | Hoover | D02H 1/00 |
| | | | | 242/131 |
| 2015/0354949 | A1 * | 12/2015 | Lecky | G06F 3/017 |
| | | | | 702/150 |
| 2017/0144873 | A1 * | 5/2017 | Colantonio | B66F 9/063 |

* cited by examiner

AUTOMATED CREEL SYSTEMS AND METHODS FOR USING SAME

CROSS-REFERENCE TO RELATED APPLICATION

This application claims priority to and the benefit of the filing date of U.S. Provisional Patent Application No. 62/359,797, filed Jul. 8, 2016, which is incorporated herein by reference in its entirety.

FIELD

This invention relates to an automated creel system for loading and delivering yarn stalk subassemblies or yarn packages to a desired location in a carpet manufacturing process.

BACKGROUND

Conventional methods of using a tufting creel involve manual loading and delivery of yarn packages or stalk subassemblies to a desired location. Such operations are time consuming and labor intensive. Thus, there is a need in the pertinent art for systems and methods that reduce the inefficiencies associated with such manual loading and delivery operations.

SUMMARY

Disclosed herein are systems and methods for loading and delivering stalk subassemblies and/or yarn packages to a desired location. In one embodiment, a system can comprise at least one processor, at least one automated guided vehicle, at least one creel assembly, and an automated creel loading assembly. In one aspect, the automated guided vehicle can be communicatively coupled to the at least one processor. In another aspect, each creel assembly can have a plurality of stalk subassemblies. Each stalk subassembly can be configured for selective secure engagement with an automated guided vehicle of the at least one automated guided vehicle. Additionally, each stalk subassembly can be configured for positioning in a selected operative position within the creel assembly. In these aspects, each stalk subassembly can comprise a base portion, a stalk, and a plurality of bullhorns. In one aspect, the stalk can extend upwardly from the base portion relative to a vertical axis. In another aspect, the plurality of bullhorns can extend outwardly from the stalk and can be spaced apart relative to the vertical axis. In this aspect, each bullhorn can be configured to engage a respective yarn package. In another aspect, the automated creel loading assembly can be communicatively coupled to the at least one processor and configured to load yarn packages onto a stalk subassembly. In these aspects, the at least one processor can be configured to selectively direct each automated guided vehicle to engage a respective stalk subassembly. Upon engagement between the automated guided vehicle and the stalk subassembly, the processor can be configured to selectively direct the automated guided vehicle to move about and between the selected operative position within the creel assembly and a loading position proximate the automated creel loading assembly.

In another embodiment, the system can comprise at least one processor, a creel assembly, and an automated guided vehicle. In one aspect, the creel assembly can have a plurality of bullhorns configured to engage respective yarn packages. In a further aspect, the automated guided vehicle can be communicatively coupled to the at least one processor. In another aspect, the automated guided vehicle can comprise a base portion, an automated creel loading assembly, and at least one yarn package storage assembly. In this aspect, an automated creel loading assembly can be positioned on the base portion and communicatively coupled to the at least one processor. In another aspect, the at least one yarn package storage assembly can be positioned on the base portion and can optionally define a plurality of engagement elements that are configured to securely engage respective yarn packages. In these aspects, each yarn package storage assembly can be selectively rotatable relative to a vertical axis to permit positioning of a selected engagement element in a desired position relative to the automated creel loading assembly. In another aspect, the at least one processor can be configured to direct movement of the automated guided vehicle to a desired location relative to the creel assembly. In a further aspect, the at least one processor can be configured to direct the automated creel loading assembly to remove selected yarn packages from the at least one yarn package storage assembly and position the selected yarn packages in engagement with selected bullhorns of the creel assembly.

DESCRIPTION OF THE DRAWINGS

The accompanying drawings, which are incorporated in and constitute a part of this specification, illustrate certain aspects of the instant invention and together with the description, serve to explain, without limitation, the principles of the invention. Like reference characters used therein indicate like parts throughout the several drawings.

DETAILED DESCRIPTION

Figure 1:
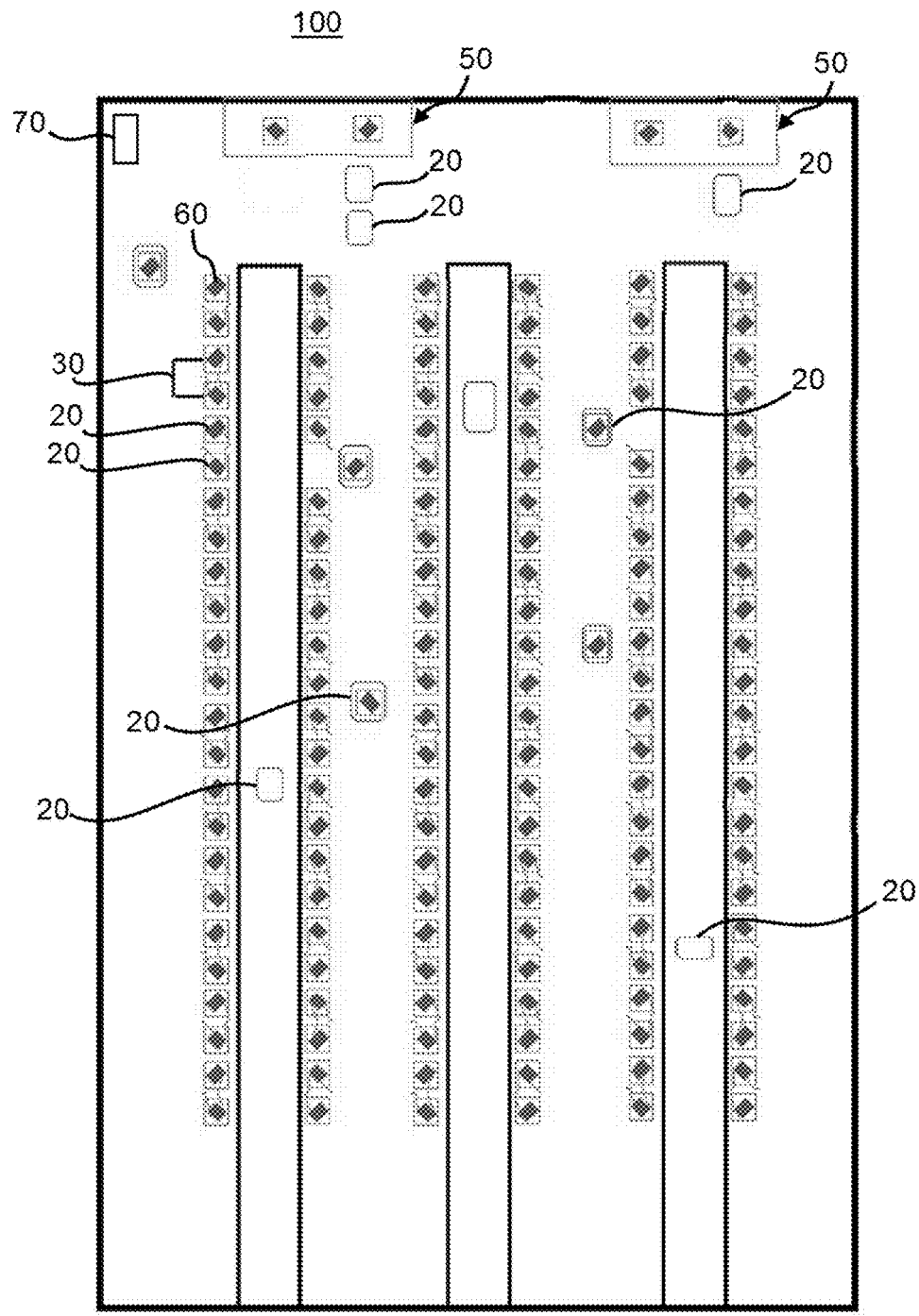
FIG. 1 is a schematic overhead view of an exemplary system for loading and delivering stalk subassemblies or yarn packages in accordance with at least one embodiment of the disclosed invention.

The present invention can be understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to "an automated guided vehicle" can include two or more such automated guided vehicles unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Disclosed herein, and with reference to FIGS. 1-11, are systems and methods for loading and delivering stalk subassemblies and/or yarn packages to a desired location.
Systems and Methods for Loading and Delivering Stalk Assemblies According to one embodiment, and as shown in FIGS. 1-2, 5-7, and 9, the system 100 can comprise at least one processor 10, at least one automated guided vehicle 20, at least one creel assembly 30, and an automated creel loading assembly 50. In one aspect, and with reference to FIGS. 1-2, each creel assembly 30 of the at least one creel assembly can comprise a plurality of stalk subassemblies 40. In this aspect, the creel assembly 30 can comprise stalk subassemblies 40 that are delivered to and positioned in an operative position by an automated guided vehicle 20 such that the splicing of yarn packages 60 of the respective stalk subassemblies together results in a continuous operating system. Optionally, each creel assembly 30 can comprise two stalk subassemblies 40, and a yarn package 60 of the first stalk subassembly can serve as a running end while a yarn package of the second stalk subassembly can serve as standby end. In further aspects, each stalk subassembly 40 can be configured for positioning in a selected operative position within the creel assembly 30.

Figure 2:
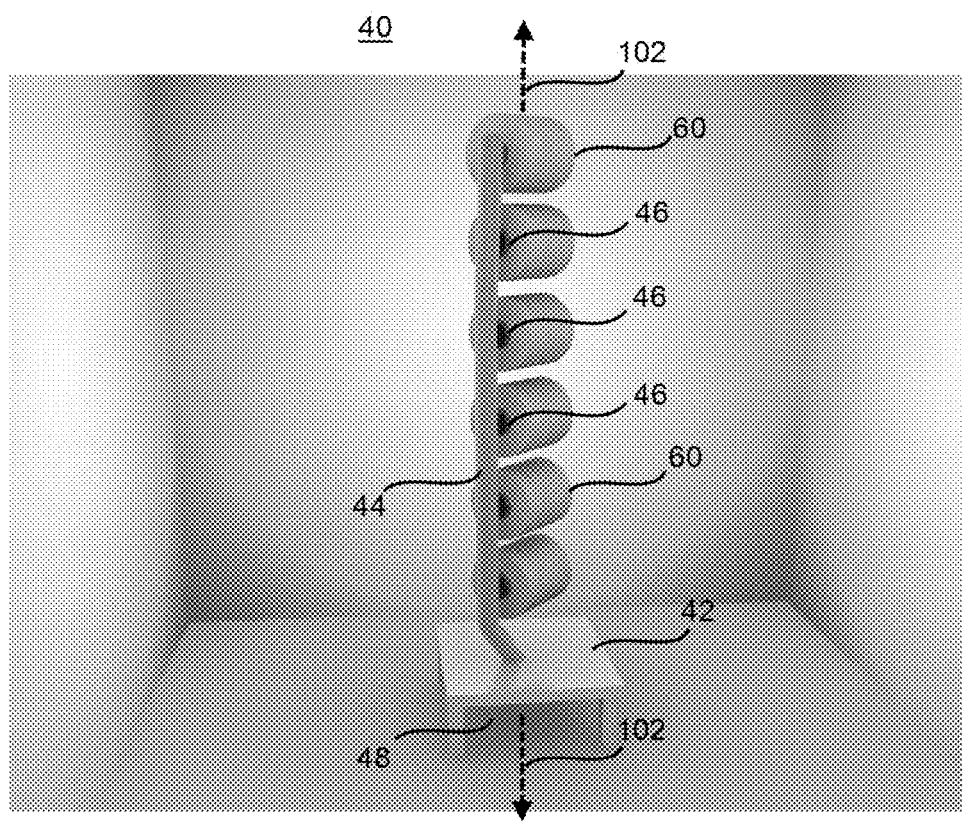
FIG. 2 is a perspective view of an exemplary stalk subassembly in accordance with at least one embodiment of the disclosed invention.
Figure 9:
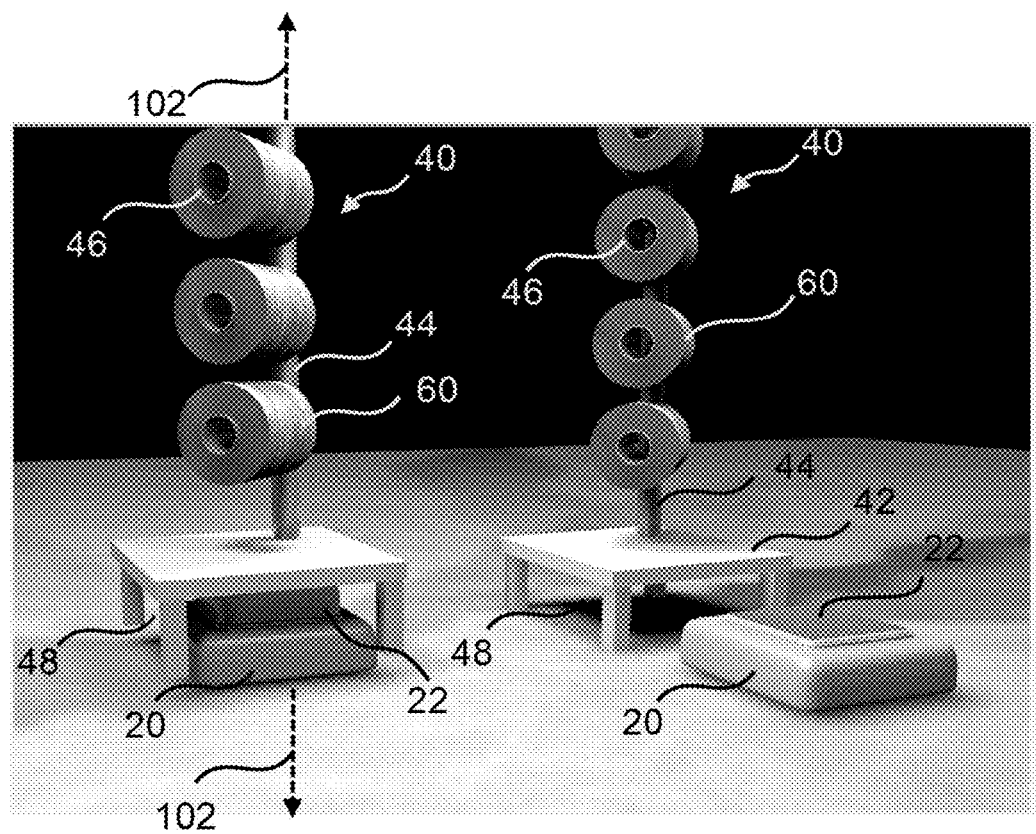
FIG. 9 is a perspective view of an exemplary system for engaging, lifting, lowering, and disengaging a stalk subassembly using an automated guided vehicle as disclosed herein.

In various aspects, each stalk subassembly 40 can be configured for selective secure engagement with an automated guided vehicle 20 of the at least one automated guided vehicle. It is contemplated that each stalk subassembly 40 can comprise a base portion 42, a stalk 44, and a plurality of bullhorns (yarn supports) 46, as shown in FIGS. 2 and 9. In exemplary aspects, the base portion 42 of each stalk subassembly 40 can have a substantially square or rectangular perimeter; however, it is contemplated that any shape can be used for the base portion 42. Optionally, in one aspect, the base portion 42 can have a substantially square perimeter having a length and a width of about 2 feet. Optionally, in exemplary aspects, the base portion 42 can define at least one engagement element configured for complementary engagement with an automated guided vehicle 20 as further disclosed herein. For example, as shown in FIGS. 2 and 9, the base portion 42 can comprise a plurality of legs that elevate portions of the base portion 42 and define a receiving space or slot 48 for receiving portions of the automated guided vehicle, as shown in FIG. 9. In one aspect, the stalk 44 can extend upwardly from the base portion 42 relative to a vertical axis 102. In this aspect, it is contemplated that the stalk 44 can have a height (relative to the vertical axis) that ranges from about 6 feet to about 10 feet or, optionally, is about 8 feet. In another aspect, the plurality of bullhorns 46 can extend outwardly from the stalk 44. Optionally, in this aspect, the bullhorns 46 can be upwardly oriented at a selected acute angle relative to the vertical axis 102. It is contemplated that the selected acute angle can range from about 15 degrees to about 60 degrees, including, for example, about 30 degrees or about 45 degrees. In further aspects, the bullhorns 46 can be spaced apart relative to the vertical axis 102. In use, it is contemplated that each bullhorn 46 can be configured to engage a respective yarn package 60. It is contemplated that any conventional bullhorn or yarn support known in the art can be used. In exemplary aspects, each of the stalk subassemblies 40 of the system 100 can be substantially identical. However, in other aspects, it is contemplated that at least one stalk subassembly 40 of the system 100 can have a different height, shape, bullhorn orientation, or overall orientation (left-hand or right-hand) than at least one other stalk subassembly of the system.

Figure 6:
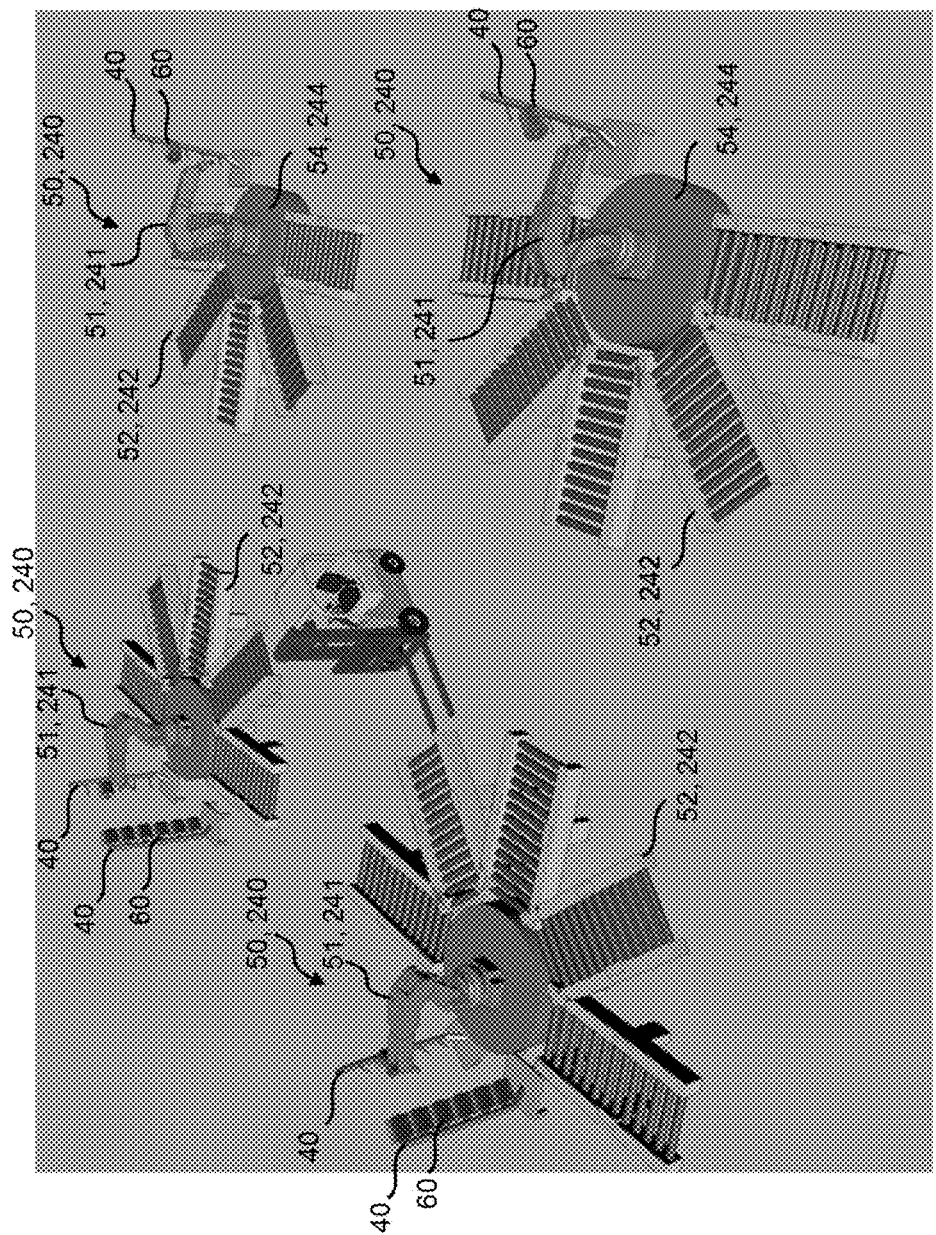
FIG. 6 is a perspective view of a group of exemplary creel loading assemblies or vehicle loading assemblies as disclosed herein.
Figure 7:
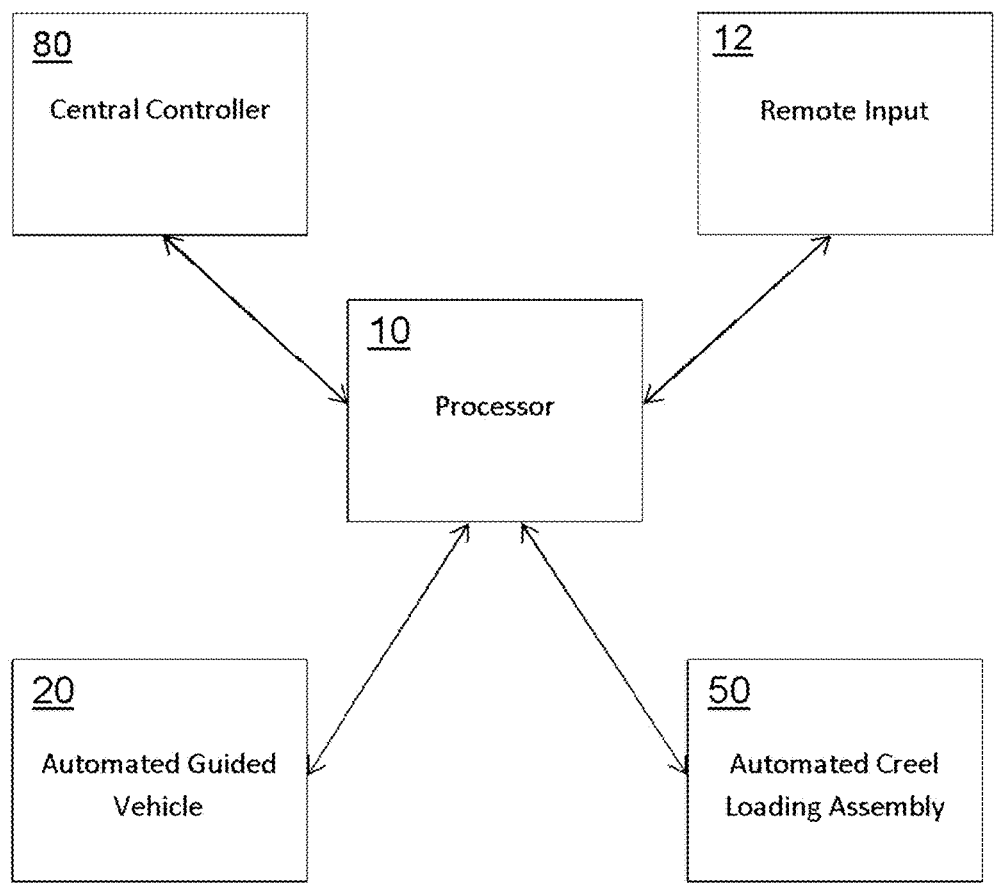
FIG. 7 is a schematic diagram of an exemplary automated system for delivering stalk subassemblies to a desired location within a creel assembly as disclosed herein.

In another aspect, the automated creel loading assembly 50 can be communicatively coupled to the at least one processor 10 and configured to load yarn packages 60 onto a stalk subassembly 40, as shown in FIG. 6. In a further aspect, the automated creel loading assembly 50 can comprise a multi-axis robot 51. In this aspect, it is contemplated that the multi-axis robot 51 can comprise at least one arm that is configured for selective movement relative to a plurality of axes, such as, for example and without limitation, at least six axes. In further exemplary aspects, it is contemplated that the arm of the multi-axis robot 51 can comprise a plurality of fingers or other engagement elements that are configured to selectively grasp or engage selected yarn packages or yarn cases.

In a further aspect, the at least one automated guided vehicle 20 can be communicatively coupled (i.e., through any conventional wireless or wired connection, including Internet-based, cellular, and network-connections) to the at least one processor 10. In these aspects, the at least one processor 10 can be configured to selectively direct each automated guided vehicle 20 to engage a respective stalk subassembly 40. In exemplary aspects, each automated guided vehicle 20 can comprise at least one engagement element 22 (e.g., a lift, arm, etc.) configured to engage corresponding portions (e.g., engagement elements) of a stalk subassembly 40. For example, in some aspects, the automated guided vehicle 20 can be configured to engage, lift, and transport a stalk subassembly 40 as further disclosed herein. More particularly, in some aspects and with reference to FIG. 9, at least a portion of the automated guided vehicle 20 can be selectively positioned within the receiving space or slot 48 of the stalk subassembly 40 (e.g., underneath the base portion of the stalk subassembly). In exemplary aspects, it is contemplated that the at least one engagement element 22 can comprise at least one platform that is configured for selective movement relative to the vertical axis 102. In these aspects, following positioning of at least a portion of the automated guided vehicle 20 within the receiving space or slot 38 of the stalk subassembly 40, the at least one engagement element 22 of the automated guided vehicle 20 can be raised to a height sufficient to engage a corresponding portion (or corresponding portions) of the stalk subassembly 40 (e.g., the bottom surface of the base portion). Following engagement between the at least one engagement element 22 of the automated guided vehicle 20 and the bottom surface of the base portion of the stalk subassembly, upward movement of the at least one engagement element can continue to thereby lift the stalk subassembly to a selected height above the ground surface, as shown in FIG. 9. In these aspects, it is contemplated that the at least one engagement element 22 of the automated guided vehicle 20 can be configured to move about and between an extended position and a retracted position relative to the vertical axis to permit selective engagement and disengagement of the stalk subassembly 40. Optionally, it is contemplated that the at least one engagement element 22 (e.g., a retractable platform) of the automated guided vehicle 20 and the base portion of the stalk subassembly 40 can comprise at least one engagement feature (e.g., a clasp or other gripping element, a friction-enhancing surface, a shoulder surface, or the like) that is configured to engage the base portion of the stalk subassembly 40 and prevent movement of the stalk subassembly relative to the automated guided vehicle 20. Optionally, it is contemplated that the at least one engagement element 22 (e.g., a retractable platform) of the automated guided vehicle 20 and the base portion of the stalk subassembly 40 can comprise respective engagement features (e.g., projections, slots, hooks, loops, grooves, ribs, clasps, shoulder surfaces, friction-enhancing surfaces, and the like) that engage with one another to prevent movement of the stalk subassembly 40 relative to the automated guided vehicle 20.

Once the automated guided vehicle 20 is operatively positioned relative to the stalk subassembly 40 (e.g., positioned within the receiving space or slot 48), the processor 10 can be configured to selectively direct the engagement element 22 to extend upwardly relative to the vertical axis to effect engagement between the engagement element and the corresponding base portion 42 of the stalk subassembly. In exemplary aspects, the processor can be communicatively coupled to an actuator (not shown) that configured to effect movement of the at least one engagement element 22 relative to the vertical axis 102. In these aspects, it is contemplated that the actuator can comprise a linear actuator, such as for example and without limitation, an electromechanical linear actuator, a hydraulic linear actuator, a pneumatic linear actuator, and the like. It is contemplated that the automated guided vehicle 20 can be configured to lift the stalk subassembly 40 any distance as desired. For example and without limitation, the automated guided vehicle 20 can be configured to lift the stalk subassembly 40 any distance ranging from about 0 mm to about 100 mm; from about 0.1 mm to about 75 mm; from about 0.5 mm to about 50 mm; from about 0.75 mm to about 25 mm; or from about 1 mm to about 20 mm (all measured from a floor surface relative to the vertical axis 102). In use, the processor can be configured to effect: engagement of the stalk subassembly by the at least one engagement element; lifting of the stalk subassembly; movement of the automated guided vehicle while the stalk subassembly is maintained in the lifted/elevated position; lowering of the stalk subassembly; disengagement of the stalk subassembly; and exit of the automated guided vehicle from the receiving space or slot 48.

Upon engagement between the automated guided vehicle 20 and the selected stalk subassembly 40, the processor 10 can be configured to selectively direct the automated guided vehicle to move about and between a delivery position proximate the selected operative position of a given stalk subassembly 40 within the creel assembly 30 and a loading position proximate the automated creel loading assembly 50. Once the automated guided vehicle 20 is operatively positioned relative to the automated creel loading assembly 50, it is contemplated the processor 10 can be configured to selectively direct the engagement element 22 (e.g., the at least one platform) of the automated guided vehicle to move to the retracted position (within the housing of the automated guided vehicle), lowering the stalk subassembly 40 for positioning proximate the automated creel loading assembly. It is contemplated, however, that the processor 10 can be configured to selectively direct the engagement element 22 to move to the retracted position at any desired time during transport to the automated creel loading assembly 50. Following loading of the stalk subassembly 40 with yarn packages as further disclosed herein, it is contemplated that the processor can direct an automated guided vehicle to engage and transport the loaded stalk subassembly to a selected position within the overall system. In use, it is contemplated that navigation of the automated guided vehicle 20 to the desired location can be facilitated by any conventional means. Optionally, in one aspect, the automated guided vehicle 20 can be configured to follow wires positioned along a guide path that the automated guided vehicle is to follow. In this aspect, the automated guided vehicle can comprise a guide sensor configured to detect the relative position of a signal (e.g., a radio signal) being transmitted from the wires. The automated guided assembly can use this information to regulate the steering circuit, causing the automated guided vehicle to follow the wire. In another optional aspect, the automated guided vehicle can be configured to follow guide tape, such as magnetic or colored tape, positioned along the guide path. In further optional aspects, the automated guided vehicle can be configured to use machine vision, magnets, lasers, and/or sensors to permit its movement to a desired location. Such exemplary mechanisms include, without limitation, laser target navigation, inertial navigation, natural features navigation, vision guidance, geoguidance, or combinations thereof. In these aspects, the automated guided vehicle can comprise a steer control system configured to selectively steer the automated guided vehicle in a desired direction. For example, such steer control systems can include differential speed control, steered wheel control, or a combination thereof. It is contemplated that the processor can be communicatively coupled to the navigation system components to permit selective adjustment of the navigational guidance provided to the automated guided vehicles disclosed herein. It is further contemplated that a map of potential delivery locations for the stalk subassemblies can be stored within a memory that is in communication with the processor, thereby allowing the processor to selectively control the operation of system components as necessary to achieve delivery of a stalk subassembly to a desired delivery location.

In another aspect, the at least one processor 10 can be configured to receive an input 12 indicative of an empty stalk subassembly. In this aspect, it is contemplated that the input 12 can be provided by a "splicer" or other worker stationed in proximity to the creel assembly. It is further contemplated that the input 12 can be provided using a remote computing device (e.g., a smartphone, tablet, laptop computer, and the like) that is communicatively coupled to the processor. Additionally, or alternatively, it is contemplated that the input 12 can be provided in an automated fashion by a vision system configured to monitor one or more stalk subassemblies for empty bullhorns. In exemplary aspects, the processor 10 can be configured to direct an automated guided vehicle 20 to engage the empty stalk subassembly and to position the empty stalk subassembly in a loading position proximate the automated creel loading assembly 50. In these aspects, in response to receiving the input 12 indicative of an empty stalk subassembly, it is contemplated that the disclosed system can employ a single automated guided vehicle or at least two automated guided vehicles (i.e., 1-AGV stalk change or 2-AGV stalk change) to accomplish a replacement of an empty stalk subassembly with a loaded stalk subassembly. Optionally, the processor 10 can be configured to direct a single automated guided vehicle 20 to replace the empty stalk subassembly with a loaded stalk subassembly by taking the following steps: (1) transporting a loaded stalk subassembly adjacent to a selected operative position of an empty stalk subassembly within a creel assembly; (2) temporarily lowering and disengaging the loaded stalk subassembly at a position near the empty stalk subassembly; (3) removing the empty stalk subassembly from a selected operative position within the creel assembly and temporarily lowering and disengaging the empty stalk subassembly at a location spaced from the selected operative position; and (4) re-engaging the loaded stalk subassembly and positioning the loaded stalk subassembly at the selected operative position within the creel assembly. Following replacement of the empty stalk subassembly with a loaded stalk subassembly, the automated guided vehicle 20 can then re-engage the empty stalk subassembly and position the empty stalk subassembly in the loading position proximate the automated creel loading assembly 50, as disclosed herein. Alternatively, upon receipt of the input 12 indicative of an empty stalk subassembly, the processor 10 can be configured to direct first and second automated guided vehicles to the location of the empty stalk subassembly. In this alternative aspect, the processor 10 can be configured to direct the first automated guided vehicle to navigate to the selected operative position within the creel assembly 30 at the location of the empty stalk subassembly, engage the empty stalk subassembly, and position the empty stalk subassembly in a loading position proximate the automated creel loading assembly 50. The processor 10 can be further configured to direct the second automated guided vehicle to arrive at the location of the empty stalk subassembly with a loaded stalk subassembly and position the loaded stalk subassembly at the selected operative position within the creel assembly 30 (after removal of the empty stalk subassembly).

Optionally, it is contemplated that the automated guided vehicle 20 can comprise wheels (not shown). In further optional aspects, it is contemplated that the wheels can be mechanically coupled to axles that permit rotation and turning of the wheels in a conventional manner. In these aspects, it is contemplated that the automated guided vehicle 20 can comprise brakes that are configured to stop movement of the vehicle.

In another aspect, the at least one creel assembly 30 can comprise a plurality of creel assemblies. In a further aspect, the at least one automated guided vehicle 20 can comprise a plurality of automated guided vehicles. Optionally, in these aspects, the plurality of creel assemblies 30 can be distributed among two stories. In further aspects, the system can comprise at least one elevator 70 that can be configured to permit selective movement of the stalk subassemblies 40 and the automated guided vehicles 20 among the two stories of creel assemblies 30. Optionally, the automated creel loading assembly 50 can be configured to load yarn packages 60 onto stalk subassemblies 40 positioned in a loading position on either of the two stories of creel assemblies 30.

Figure 5:
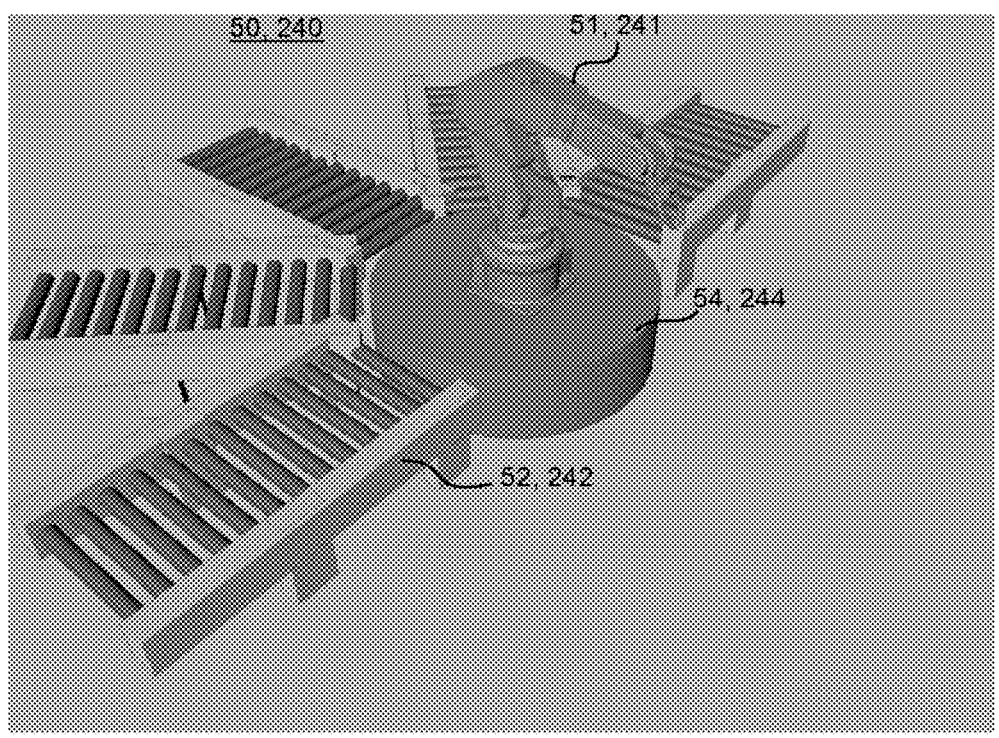
FIG. 5 is a perspective view of an exemplary creel loading assembly or vehicle loading assembly as disclosed herein.

Optionally, in an exemplary aspect, the automated creel loading assembly 50 can comprise a platform 54 that supports the multi-axis robot 51 as shown in FIGS. 5-6. Optionally, in a further aspect, the automated creel loading assembly 50 can comprise at least one belt or conveyor 52 configured to receive yarn packages (optionally, yarn packages provided as part of yarn cases) that are either manually loaded or loaded onto the belt by a lift truck. In use, the at least one belt or conveyor 52 can be configured to advance yarn packages to a location that is accessible by the multi-axis robot 51. In exemplary aspects, the automated creel loading assembly 50 can be configured to detect indicia provided on each yarn package 60 received by the automated creel loading assembly. In this aspect, the automated creel loading assembly 50 can be configured to transmit an identification signal to the at least one processor 10 that is indicative of the detected indicia. In these aspects, the at least one processor 10 can be configured to identify the detected yarn package 60 based upon the received identification signal. It is further contemplated that the automated creel loading assembly 50 and the at least one processor 10 can each be in communication with a respective wireless transmitter/receiver to permit communication between the automated creel loading assembly and the processor. Alternatively, it is contemplated that a conventional wired connection can be used. It is contemplated that if the identified yarn package corresponds to a desired yarn package type, the processor 10 can be configured to direct the automated creel loading assembly 50 to load the identified yarn package onto a selected bullhorn 46 of a stalk subassembly 40. In exemplary non-limiting aspects, it is contemplated that the automated creel loading assembly 50 can comprise at least one detector (e.g., a barcode detector, an RFID detector, and the like) that is configured to detect the indicia (e.g., barcode, SKU, RFID tag, and the like) associated with the yarn package 60. In another aspect, the system 100 can comprise at least one waste removal belt (not shown) that can be configured to direct yarn package waste away from the automated creel loading assembly 50. It is contemplated that the automated creel loading assembly 50 can be configured to remove yarn package waste from a stalk subassembly 40 positioned in the loading position. It is further contemplated that the automated creel loading assembly 50 can be configured to place the removed yarn package waste on the waste removal belt. Alternatively, in other aspects, it is contemplated that yarn package waste can be manually removed from stalk subassemblies 40. In these aspects, it is contemplated that the automated guided vehicles 20 can be configured to transport an empty stalk subassembly 40 to a stalk/tube unloading area before returning the stalk subassembly 40 to the automated creel loading assembly 50. It is contemplated that the yarn tubes and other waste from the empty stalk subassembly 40 can be unloaded at the stalk/tube unloading area.

As one having ordinary skill in the pertinent art will appreciate, the processor can be any processing element known in the art, such as, without limitation, a personal computer, a server computer, a tablet, a smartphone, and the like. As one having ordinary skill in the pertinent art will further appreciate, the processor can comprise any of a number of processing devices, systems or the like that are capable of operating in accordance with the embodiments of the invention. It is contemplated that the processor can be in communication with a memory that stores content, data, or the like. The memory can also store software applications, instructions, or the like for the processor to perform steps associated, for example, with loading or delivering yarn packages to a desired location, as described herein. It is further contemplated that the processor can be connected to at least one interface or other means for displaying, transmitting, and/or receiving data, content, or the like. The interface can include at least one communication interface or other means for transmitting and/or receiving data, content, or the like, as well as at least one user interface that can include a display and/or a user input interface. The user input interface, in turn, can comprise any of a number of devices allowing the processor to receive data from a user, such as a keypad, a touch display, a joystick or other input device.

In operation, according to one embodiment, the at least one processor 10 can instruct an automated creel loading assembly 50 to load yarn packages onto a stalk subassembly 40. In this aspect, the processor can also instruct an automated guided vehicle 20 to engage the stalk subassembly 40. In another aspect, the processor 10 can instruct the automated guided vehicle 20 to deliver the stalk subassembly 40 to a selected operative position within the creel assembly 30. Prior to delivery of the loaded stalk subassembly to the selected operative position, in a further aspect, the at least one processor can receive an input 12 indicative of an empty stalk subassembly and instruct an automated guided vehicle to engage the empty stalk subassembly and remove the empty stalk subassembly from the creel assembly, as further disclosed herein. For example, in exemplary aspects, the processor 10 can receive an input 12 from a remote location (e.g., an input provided by a worker within the system) indicating that a particular stalk assembly 40 (or at least one of the bullhorns of the stalk assembly) is empty. Upon receipt of the input 12, the processor 10 can direct the automated guided vehicle 20 to remove the empty stalk subassembly from the creel assembly 30. The processor 10 can be configured to also direct the automated guided vehicle 20 to replace the empty stalk subassembly with a loaded stalk subassembly. Optionally, in some aspects, the processor 10 can direct the automated guided vehicle 20 to arrive at the location of the empty stalk subassembly (i.e., the selected operative position within the creel) with a loaded stalk subassembly, as further described herein. Alternatively, in other aspects, the processor 10 can direct first and second automated guided vehicles to navigate to the location of the empty stalk subassembly, with the first automated guided vehicle being directed to remove the empty stalk subassembly from the creel assembly 30 and the second automated guided vehicle directed to deliver a loaded stalk subassembly to the selected operative position within the creel assembly. It is contemplated that the selected operative position can correspond to a previous location of the empty stalk subassembly within the creel assembly 30. In use, it is contemplated that the disclosed systems and methods can permit automated delivery of yarn packages 60 to a desired position within a creel assembly 30 without the need for human lifting of the yarn packages.

According to another embodiment, in operation, an automated creel loading assembly 50 can receive one or more yarn packages 60. Prior to placement of the yarn packages 60 (optionally, in the form of yarn cases) proximate the automated creel loading assembly 50, it is contemplated that the yarn packages can have their stretch wrap and top cap removed. In another aspect, the automated creel loading assembly 50 can detect indicia, such as the yarn SKU, on each yarn package 60 received by the automated creel loading assembly. In a further aspect, the automated creel loading assembly 50 can transmit an identification signal to the at least one processor 10 indicative of the detected indicia, and the at least one processor can identify the detected yarn package based upon the received identification signal. It is contemplated that a plurality of stalk subassemblies 40 can be in loading positions next to the automated creel loading assembly 50. In still a further aspect, the yarn package waste can be removed via a waste removal belt, such as an overhead conveyor or ground level conveyor.

In another aspect, the automated guided vehicle 20 can engage the stalk subassembly 40 such that the stalk subassembly can be delivered to the creel assembly 30 and dropped off for tie-in by a tufting personnel or splicer. In this aspect, the automated guided vehicle 20 can comprise an engagement portion 22 (e.g., a lift apparatus, a clamp apparatus, a hook, and the like) that is configured to selectively engage the base portion of a stalk subassembly, as further described herein. For example, in one aspect, the automated guided vehicle 20 can comprise a lift apparatus having at least one engagement element 22 that is configured to partially or fully slide within a receiving space or slot 48 defined by the base portion 42 of the stalk subassembly. In exemplary aspects, the at least one engagement element 22 of the lift apparatus can comprise an arm (or a plurality of arms), a panel, a platform, a gripper (or a plurality of grippers), or the like. In further exemplary aspects, the lift apparatus can further comprise an actuator that is communicatively coupled (through a wired or wireless connection) to the at least one engagement element 22 and that is configured to effect selective movement of the lift apparatus relative to at least a vertical axis. Optionally, in these aspects, it is contemplated that the actuator can be configured to effect selective movement of the at least one engagement element relative to at least one additional axis (other than the vertical axis), such as, for example, an axis that is perpendicular to the vertical axis (optionally, an axis that extends in a forward direction relative to a front (leading) surface of an automated guided vehicle), thereby assisting with positioning of the at least one engagement element within the receiving space of the base of the stalk subassembly. It is contemplated that the actuator can be a linear actuator, such as, for example and without limitation, a mechanical linear actuator, an electromechanical linear actuator, a hydraulic linear actuator, a pneumatic linear actuator, and the like. In use, after at least a portion of the at least one engagement element is received within the receiving space or slot defined by the base portion of the stalk assembly, the actuator can be activated to move the at least one engagement element in an upward direction to engage a portion of the base portion of the stalk subassembly and apply a lifting force to the stalk subassembly. Following lifting of the stalk subassembly to provide sufficient clearance between the base portion of the stalk subassembly and the flooring surface, the automated guided vehicle can retain the stalk subassembly in the elevated position while the automated guided vehicle moves toward the selected operative position for the stalk subassembly. When the automated guided vehicle arrives at the delivery position proximate the selected operative position, the actuator can be instructed (by the processor) to lower the at least one engagement element until the base portion of the stalk subassembly contacts the floor surface in the selected operative position. The at least one engagement element can then be disengaged from the base portion of the stalk subassembly through: movement of the at least one engagement element relative to the vertical axis (effected by the actuator); movement of the at least one engagement element relative to an axis that is perpendicular to the vertical axis (effected by the actuator); or movement of automated guided vehicle (causing a corresponding movement of the at least one engagement element); or combinations thereof.

In a further aspect, empty stalk subassemblies can be removed by the automated guided vehicle 20 once all yarn packages 60 have been used. In still a further aspect, the automated guided vehicle 20 can bring the empty stalk subassemblies to the automated creel loading assembly 50 and stay underneath the stalk subassembly while loading, unless the system reprioritizes the automated guided vehicle to go elsewhere. Once loaded, the automated guided vehicle 20 can deliver the stalk subassembly 40 to the creel assembly 30, drop off the stalk subassembly, and either back out of that position or move underneath the area where yarns are placed into creel tubes.

Thus, in use, stalk subassemblies can be moved into place by an automated guided vehicle 20 and dropped off individually in selected operative locations, with pairs of stalk subassemblies forming a creel assembly that allows for continuous operation of the tufting machine (e.g., by allowing the spliced together packages to transfer from one stalk subassembly to the other). Automated guided vehicles can then engage an empty stalk subassembly at the direction of the system controller 80. Each empty stalk subassembly can be engaged by an automated guided vehicle (a) while the empty stalk subassembly is positioned in an operative position within the creel or (b) while the empty stalk subassembly is positioned in a separate, designated location where empty stalk subassemblies are located. Following engagement between the automated guided vehicle and the empty stalk subassembly, the automated guided vehicle can transport the empty stalk subassembly to the automated creel loading assembly, where yarn packages can be loaded onto the empty stalk subassembly. Following loading of the empty stalk subassembly, the automated guided vehicle can then position the loaded stalk subassembly in a desired location within the creel, and the process can be repeated as directed by the system controller 80.

Systems and Methods for Loading and Delivering Yarn Packages

According to another embodiment, and with reference to FIGS. 3-6, 8, and 10-11, a tufting creel assembly can be automatically loaded using a system 200 comprising an automated guided vehicle 230 that is fitted with an automated creel loading assembly 234, such as a multi-axis robot, such that the automated creel loading assembly can reach into a standard creel with tying aisles.

The automated guided vehicle 230 can be loaded using various methods. For example, and without limitation, yarn packages 60 can be loaded onto the empty bullhorns of a creel (e.g., a conventional creel or a plurality of stalk subassemblies 40 as disclosed herein) while the automated guided vehicle 230 remains idle, which allows the yarn packages to then be loaded onto the automated guided vehicle using the automated creel loading assembly 234. It is contemplated that the automated creel loading assembly 234 can be a high speed, high capacity loading system (e.g., a system capable of loading at least 10, at least 15, or at least 20 yarn packages per minute). It is contemplated that the plurality of yarn packages 60 can be set aside and staged for later lifting and placing onto the automated guided vehicle 230.

Figure 3:
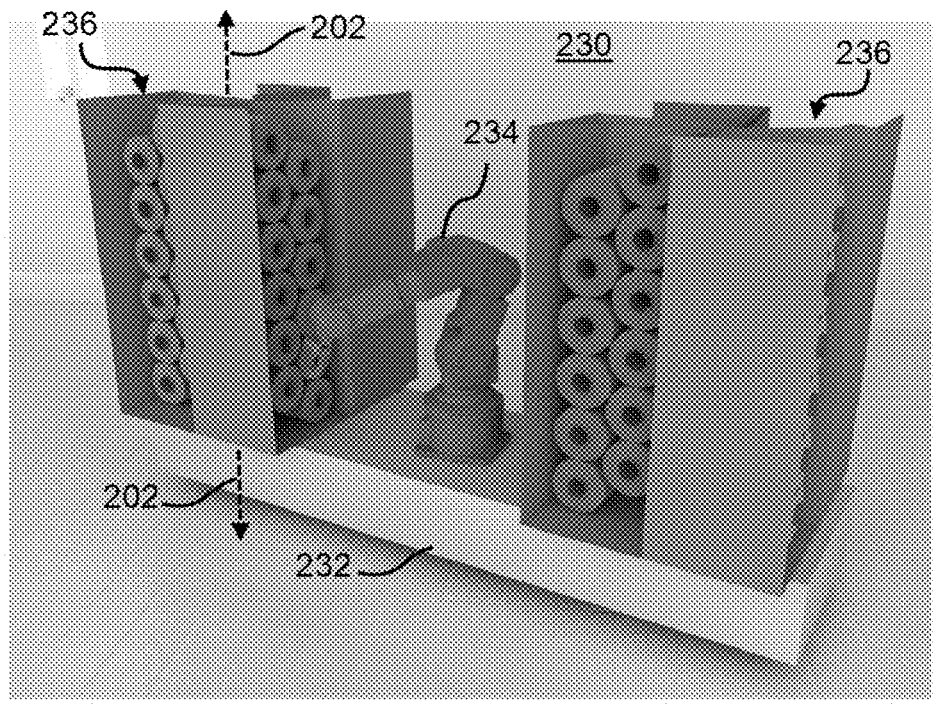
FIG. 3 is a perspective view of an exemplary system for loading yarn packages onto a stalk subassembly in accordance with at least one embodiment of the disclosed invention.
Figure 4:
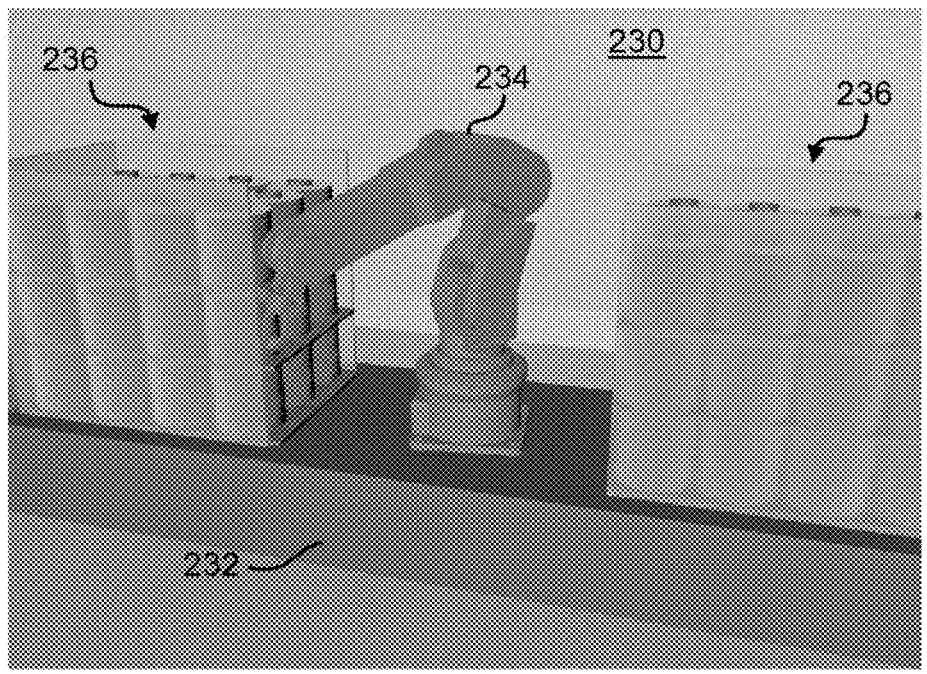
FIG. 4 is a perspective view of an exemplary system for loading yarn packages onto a yarn package storage assembly in accordance with at least one embodiment of the disclosed invention.

Referring to FIGS. 3-6, 8, and 10-11, in another exemplary embodiment, the system 200 can comprise at least one processor 210, a creel assembly, and an automated guided vehicle 230. In one aspect, the creel assembly can have a plurality of bullhorns configured to engage respective yarn packages. It is contemplated that the creel assembly can be any conventional creel assembly as is known in the art. In another aspect, as shown in FIGS. 3-4, the automated guided vehicle 230 can comprise a base portion 232, an automated creel loading assembly 234, and at least one yarn package storage assembly 236. Optionally, the automated guided vehicle 230 can comprise wheels. In further optional aspects, it is contemplated that the wheels can be mechanically coupled to axles that permit rotation and turning of the wheels in a conventional manner. In these aspects, it is contemplated that the automated guided vehicle 230 can comprise brakes that are configured to stop movement of the vehicle. In another aspect, an automated creel loading assembly 234 can be positioned on the base portion 232 and communicatively coupled to the at least one processor 210. In another aspect, the at least one yarn package storage assembly 236 can be positioned on the base portion 232. Optionally, in this aspect, the at least one yarn package storage assembly 236 can define a plurality of engagement elements that are configured to securely engage respective yarn packages. For example, in some aspects, the plurality of engagement elements can comprise at least one horizontal panel that separates various levels of yarn packages. In other aspects, it is contemplated that the plurality of engagement elements can comprise a plurality of vertical dividers that define a plurality of vertical compartments or receptacles for receiving yarn packages. In exemplary aspects, each yarn package storage assembly 236 can be selectively rotatable relative to a vertical axis 202 to permit positioning of a selected engagement element (and associated yarn packages) in a desired position relative to the automated creel loading assembly 50. In exemplary aspects, as shown in FIGS. 3-4, it is contemplated that the at least one yarn package storage assembly 236 can comprise first and second yarn package storage assemblies positioned on opposing sides of the automated creel loading assembly 234.

Figure 8:
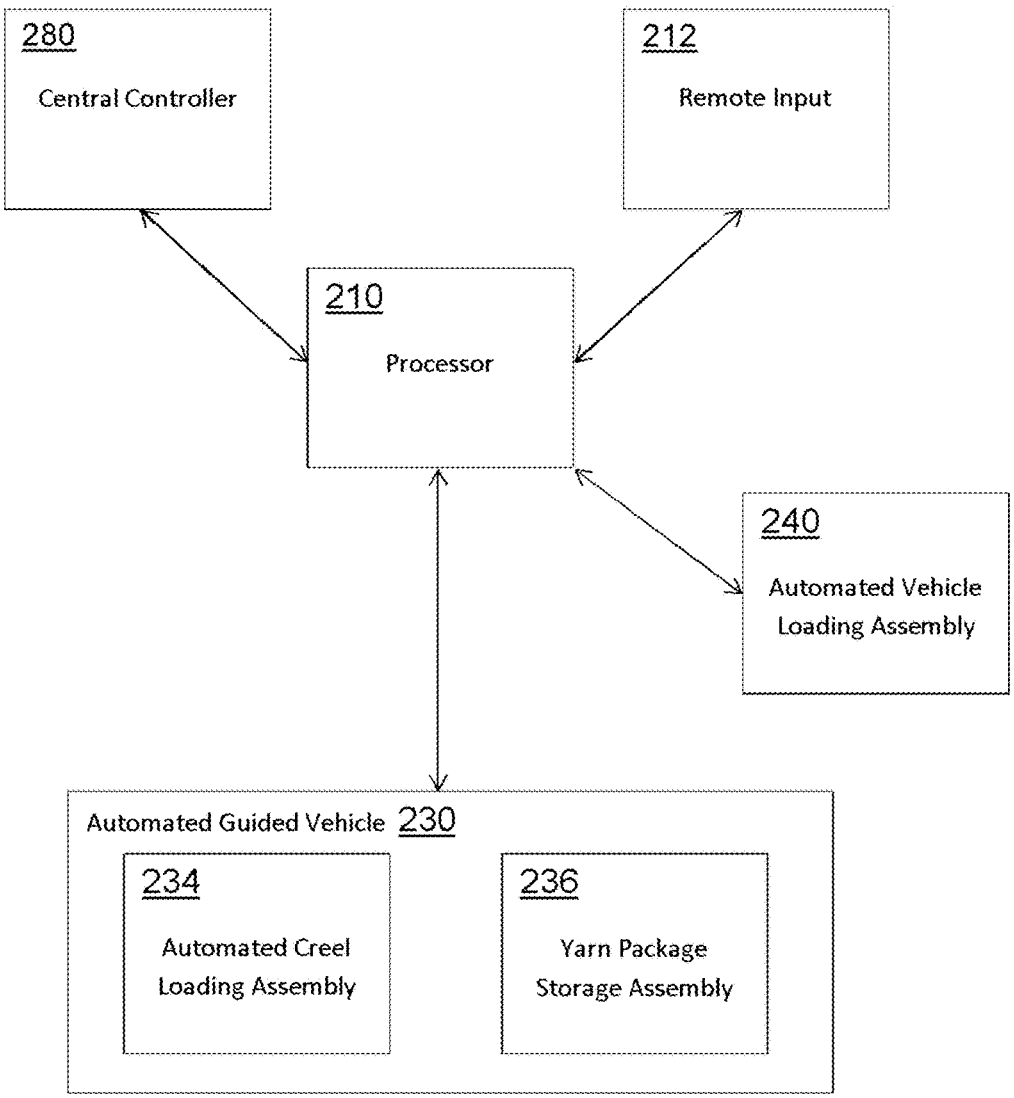
FIG. 8 is a schematic diagram of an exemplary automated system for delivering yarn packages to a creel assembly as disclosed herein.

In another aspect, and with reference to FIG. 8, the automated guided vehicle 230 can be communicatively coupled to the at least one processor 210. In another aspect, the at least one processor 210 can be configured to direct movement of the automated guided vehicle 230 to a desired location relative to the creel assembly. In a further aspect, the processor 210 can be configured to receive an input 212 indicative of an empty bullhorn or empty stalk subassembly. It is contemplated that the input 212 can be provided by a "splicer" or other worker stationed in proximity to the creel assemblies within the system. It is further contemplated that the input 212 can be provided using a remote computing device (e.g., a smartphone, tablet, laptop computer, and the like) that is communicatively coupled to the processor. Additionally, or alternatively, it is contemplated that the input 212 can be provided in an automated fashion by a vision system configured to monitor one or more creel assemblies for empty bullhorns. In an exemplary aspect, the processor 210 can be configured to direct an automated guided vehicle 230 to position the automated creel loading assembly 234 in a loading position proximate the empty bullhorn. In a further aspect, the at least one processor 210 can be configured to direct the automated creel loading assembly 234 to remove selected yarn packages from the at least one yarn package storage assembly 236 and position the selected yarn packages in engagement with selected bullhorns of the creel assembly.

In a further aspect, as shown in FIGS. 3-4, it is contemplated that the automated creel loading assembly 234 can comprise a multi-axis robot. In various aspects, it is contemplated that the multi-axis robot can comprise at least one arm that is configured for selective movement relative to a plurality of axes, such as, for example and without limitation, up to six axes. In these aspects, it is contemplated that the automated guided vehicle, which is selectively moveable relative to two axes, can cooperate with the multi-axis robot to permit selective movement of a yarn package relative to up to eight axes. In further exemplary aspects, it is contemplated that the arm of the multi-axis robot can comprise a plurality of fingers or other engagement elements that are configured to selectively grasp or engage selected yarn packages or yarn cases.

Figure 10:
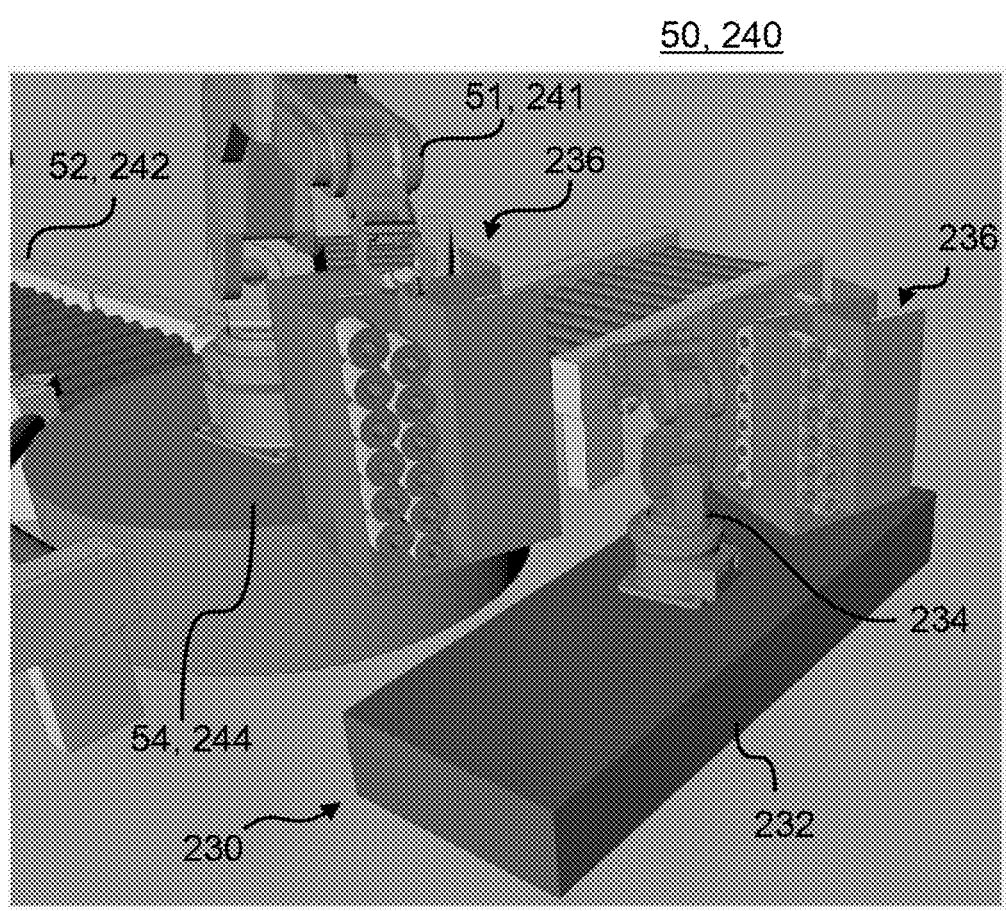
FIG. 10 is a perspective view of an exemplary system for loading yarn package storage assemblies onto an automated guided vehicle as disclosed herein.
Figure 11:
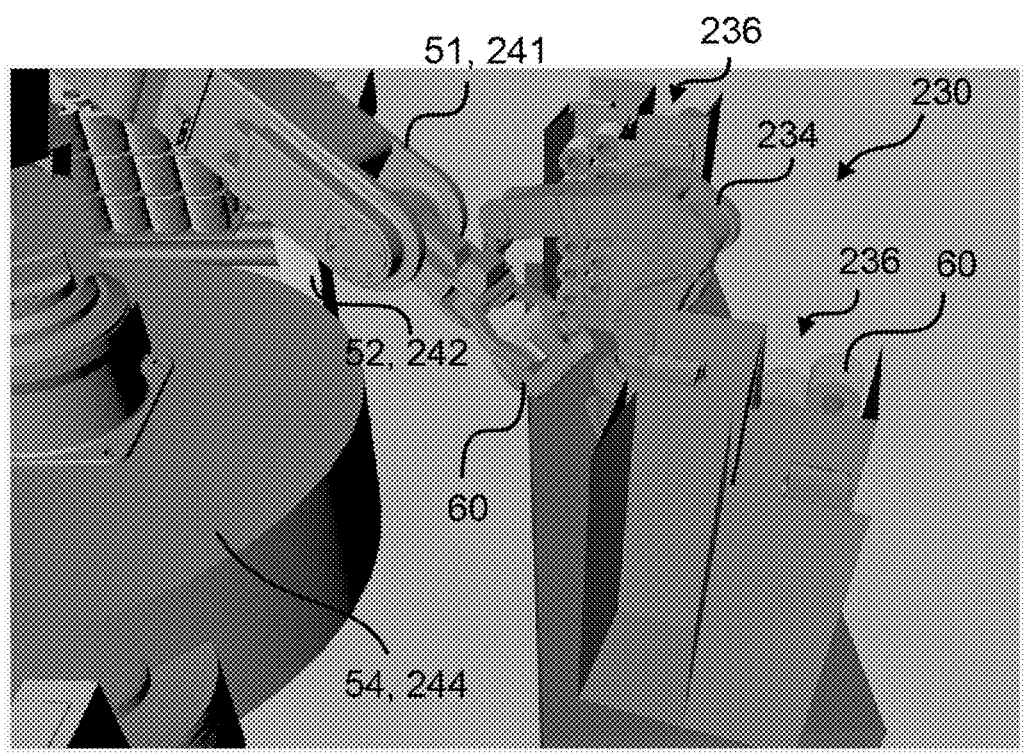
FIG. 11 is a perspective view of an exemplary system for loading yarn packages onto a yarn package storage assembly positioned on an automated guided vehicle as disclosed herein.

In another aspect, as shown in FIGS. 5-6 and 10-11, the system 200 can further comprise an automated vehicle loading assembly 240 that can be communicatively coupled to the at least one processor 210. In this aspect, and as shown in FIG. 11, the at least one processor 210 can be configured to direct the automated vehicle loading assembly 240 to load yarn packages onto a yarn package storage assembly 236. In another aspect, the automated vehicle loading assembly 240 can be configured to load yarn packages on a yarn package storage assembly 236 positioned on an automated guided vehicle 230. Optionally, in another aspect, the automated vehicle loading assembly 240 can be configured to load yarn cases (i.e., a full case pre-loaded with yarn packages) onto an automated guided vehicle 230. Optionally, in still another aspect and as shown in FIG. 10, the automated vehicle loading assembly 240 can be configured to load pre-loaded yarn package storage assemblies 236 onto an automated guided vehicle 230.

Optionally, in an exemplary aspect, the automated vehicle loading assembly 240 can comprise a platform 244 that supports a multi-axis robot 241 as shown in FIGS. 5-6 and 10-11. In various aspects, it is contemplated that the multi-axis robot 241 can comprise at least one arm that is configured for selective movement relative to a plurality of axes, such as, for example and without limitation, up to six axes.

In further exemplary aspects, it is contemplated that the arm of the multi-axis robot 241 can comprise a plurality of fingers or other engagement elements that are configured to selectively grasp or engage selected yarn packages, yarn cases, or pre-loaded yarn package storage assemblies. Optionally, in a further aspect and as shown in FIG. 11, the automated vehicle loading assembly 240 can comprise at least one belt or conveyor 242 configured to receive yarn packages (optionally, full cases of yarn packages) that are loaded onto the belt by a lift truck or other equipment. Optionally, in still another aspect and as shown in FIG. 10, it is contemplated that the belt or conveyor 242 can be configured to receive a pre-loaded yarn package storage assembly 236. Prior to placement of the yarn packages proximate the automated vehicle loading assembly 240, it is contemplated that the yarn packages can have their stretch wrap and top cap removed, using either manual or automated means. In use, the at least one belt or conveyor 242 can be configured to advance, or permit advancement of, yarn packages (or yarn cases or yarn package storage assemblies) to a location that is accessible by the multi-axis robot 241. Optionally, in exemplary aspects, the automated vehicle loading assembly 240 can be configured to detect indicia provided on each yarn package 60 received by the automated vehicle loading assembly. In this aspect, the automated vehicle loading assembly 240 can be configured to transmit an identification signal to the at least one processor indicative of the detected indicia. In a further aspect, the at least one processor 210 can be configured to identify the detected yarn package based upon the received identification signal. If the identified yarn package corresponds to a desired yarn package type for a selected storage position within a creel storage assembly 236, the at least one processor can be configured to direct the automated vehicle loading assembly 240 to load the identified yarn package onto the creel storage assembly 236 of an automated guided vehicle 230 in the selected storage position. It is contemplated that the at least one processor 210 can be configured to associate each individually loaded yarn package with a corresponding position within a creel storage assembly 236 of the automated guided vehicle.

In exemplary non-limiting aspects, it is contemplated that the automated vehicle loading assembly 240 can comprise at least one detector (e.g., a barcode detector, an RFID detector, and the like) that is configured to detect the indicia (e.g., barcode, SKU, RFID tag, and the like) associated with the yarn package. It is further contemplated that the automated vehicle loading assembly 240 and the at least one processor 210 can each be in communication with a respective wireless transmitter/receiver to permit communication between the automated vehicle loading assembly and the processor. Alternatively, it is contemplated that a conventional wired connection can be used.

In some exemplary aspects, and with reference to FIG. 4, rather than loading individual yarn packages, it is contemplated that the vehicle loading assembly 240 can load an entire yarn case, which comprises a plurality of yarn packages. In these aspects, it is contemplated that each yarn storage assembly 236 can be configured to receive a respective case of yarn. Optionally, in these aspects, and with reference to FIG. 6, it is contemplated that an automated guided vehicle 230 can comprise first and second yarn cases positioned on opposing sides of an automated creel loading assembly 234. In use, it is contemplated that the automated creel loading assembly can be configured to select yarn packages to be removed from each layer of the yarn cases, while the yarn cases remain stationary within each yarn storage assembly.

In still further exemplary aspects, and with reference to FIGS. 10 and 11, each automated guided vehicle 230 can have at least one yarn storage assembly 236 positioned on the base portion 232 of the vehicle. Optionally, the at least one yarn storage assembly 236 can comprise at least first and second yarn storage assemblies 236 positioned on opposing sides of the automated creel loading assembly 234. In exemplary aspects, and as shown in FIG. 10, the yarn storage assemblies 236 can be pre-loaded with yarn packages and then selectively positioned on the automated guided vehicle 230 using the vehicle loading assembly 240. In other exemplary aspects, and as shown in FIG. 11, the yarn storage assemblies 236 can be secured on the base portion of the automated guided vehicle 230 while they are loaded with individual yarn packages using the vehicle loading assembly 240.

In another aspect, the automated creel loading assembly 234 positioned on an automated guided vehicle 230 can be configured to detect indicia provided on each yarn package received and/or engaged by the at least one yarn package storage assembly 236. In this aspect, the automated creel loading assembly 234 can be configured to transmit an identification signal to the at least one processor indicative of the detected indicia. In a further aspect, the at least one processor can be configured to identify the detected yarn package based upon the received identification signal. If the identified yarn package corresponds to a desired yarn package type, the at least one processor can be configured to direct the automated creel loading assembly to load the identified yarn package onto a selected bullhorn of the creel assembly. In exemplary non-limiting aspects, it is contemplated that the automated creel loading assembly can comprise at least one detector (e.g., a barcode detector, an RFID detector, and the like) that is configured to detect the indicia (e.g., barcode, SKU, RFID tag, and the like) associated with the yarn package. It is further contemplated that the automated creel loading assembly and the at least one processor can each be in communication with a respective wireless transmitter/receiver to permit communication between the automated creel loading assembly and the processor. Alternatively, it is contemplated that a conventional wired connection can be used.

Optionally, in another aspect, and with reference to FIGS. 3-4, it is contemplated that the system can comprise at least one rotational actuator 237. Each rotational actuator 237 can be communicatively coupled to the at least one processor 210 and configured to effect selective rotational movement of a respective yarn package storage assembly 236. In a further aspect, the processor 210 can be configured to selectively activate the at least one actuator 237 to control rotation of the at least one yarn package storage assembly 236 until the automated creel loading assembly 234 detects a yarn package corresponding to a desired yarn package type. In exemplary aspects, the processor 210 can be configured to monitor the rotational position of each respective yarn package within a creel storage assembly 236 of the automated guided vehicle, thereby allowing the processor to selectively control rotation of each creel storage assembly 236 such that selected yarn packages are provided to the creel loading assembly 234 in an easily accessible position. In further exemplary aspects, the processor 210 can be configured to receive an input from a remote computing device (e.g., an input provided by a splicer) that is indicative of a selected yarn package type to be loaded onto the creel assembly, and the processor 210 can be configured to rotate a yarn package storage assembly 236 to provide a yarn package corresponding to the selected yarn package type to the automated creel loading assembly 234.

In still a further aspect, the automated creel loading assembly 234 can be configured to remove yarn package waste from the creel assembly and position the yarn package waste within a yarn package storage assembly 236.

In operation, according to one embodiment, the at least one processor can instruct an automated guided vehicle to position an automated creel loading assembly in a loading position proximate the creel assembly. The at least one processor can also instruct the automated creel loading assembly to load yarn packages onto a selected bullhorn of the creel assembly. Prior to positioning the automated creel loading assembly in the loading position, the at least one processor can receive an input indicative of an empty bullhorn. For example, in exemplary aspects, the processor can receive an input from a remote location (e.g., an input provided by a worker within the system) indicating that a particular bullhorn is empty. Following positioning the automated creel loading assembly in the loading position, the at least one processor can instruct the automated creel loading assembly to remove yarn package waste from the empty bullhorn. The loading position can correspond to a location of the empty bullhorn within the creel assembly.

In one aspect, the automated guided vehicle 230 can be bookended by at least two yarn package storage assemblies 236, which can be pre-loaded or loaded using a vehicle loading assembly 240 as disclosed herein. In another aspect, the automated guided vehicle 230 can move through the creel assembly, and the yarn package storage assemblies 236 can be made available to the automated creel loading assembly 234 by rotation of the yarn package storage assemblies. In a further aspect, the engagement elements of the yarn package storage assemblies 236 can comprise dividers and/or bottom caps, and the dividers and/or bottom caps of the yarn package storage assemblies can be removed by the automated creel loading assembly 234 and stored onto the automated guided vehicle 230 or at a desired location in the system as scrap cardboard. Prior to the loading step, in another aspect, the automated creel loading assembly 234 can remove an empty yarn package from a particular bullhorn, and the remnants of the empty yarn package can be stored at a desired location on the automated guided vehicle 230. The yarn package storage assemblies 236 can rotate to present a desired yarn package to the automated creel loading assembly 234 for positioning in the creel assembly.

As one having ordinary skill in the pertinent art will appreciate, the processor 210 can be any processing element known in the art, such as, without limitation, a personal computer, a server computer, a tablet, a smartphone, and the like. As one having ordinary skill in the pertinent art will further appreciate, the processor can comprise any of a number of processing devices, systems or the like that are capable of operating in accordance with the embodiments of the invention. It is contemplated that the processor can be in communication with a memory that stores content, data, or the like. The memory can also store software applications, instructions, or the like for the processor to perform steps associated, for example, with loading or delivering yarn packages to a desired location, as described herein. It is further contemplated that the processor can be connected to at least one interface or other means for displaying, transmitting, and/or receiving data, content, or the like. The interface can include at least one communication interface or other means for transmitting and/or receiving data, content, or the like, as well as at least one user interface that can include a display and/or a user input interface. The user input interface, in turn, can comprise any of a number of devices allowing the processor to receive data from a user, such as a keypad, a touch display, a joystick or other input device.

In use, it is contemplated that navigation of the automated guided vehicle 230 to a desired location can be facilitated by any conventional means. Optionally, in one aspect, the automated guided vehicle 230 can be configured to follow wires positioned along a guide path that the automated guided vehicle is to follow. In this aspect, the automated guided vehicle can comprise a guide sensor configured to detect the relative position of a signal (e.g., a radio signal) being transmitted from the wires. The automated guided vehicle can use this information to regulate the steering circuit, causing the automated guided vehicle to follow the wire. In another optional aspect, the automated guided vehicle can be configured to follow guide tape, such as magnetic or colored tape, positioned along the guide path. In further optional aspects, the automated guided vehicle can be configured to use machine vision, magnets, lasers, and/or sensors to permit its movement to a desired location. Such exemplary mechanisms include, without limitation, laser target navigation, inertial navigation, natural features navigation, vision guidance, geoguidance, or combinations thereof. In these aspects, the automated guided vehicle can comprise a steer control system configured to selectively steer the automated guided vehicle in a desired direction. For example, such steer control systems can include differential speed control, steered wheel control, or a combination thereof. It is contemplated that the processor can be communicatively coupled to the navigation system components to permit selective adjustment of the navigational guidance provided to the automated guided vehicles disclosed herein. It is further contemplated that a map of potential delivery locations for the yarn packages can be stored within a memory that is in communication with the processor, thereby allowing the processor to selectively control the operation of system components as necessary to achieve delivery of a yarn package to a desired delivery location.

Although several embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. It is thus understood that the invention is not limited to the specific embodiments disclosed hereinabove, and that many modifications and other embodiments are intended to be included within the scope of the appended claims. Moreover, although specific terms are employed herein, as well as in the claims which follow, they are used only in a generic and descriptive sense, and not for the purposes of limiting the described invention, nor the claims which follow.

Exemplary Aspects

In view of the described systems and methods and variations thereof, below are more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A system comprising: at least one processor; at least one automated guided vehicle communicatively coupled to the at least one processor; at least one creel assembly, each creel assembly having a plurality of stalk subassemblies, each stalk subassembly being configured for selective secure engagement with an automated guided vehicle of the at least one automated guided vehicle and being configured for positioning in a selected operative position within the creel assembly, wherein each stalk subassembly comprises: a base portion; a stalk extending upwardly from the base portion relative to a vertical axis; and a plurality of bullhorns extending outwardly from the stalk and spaced apart relative to the vertical axis, wherein each bullhorn is configured to engage a respective yarn package; and an automated creel loading assembly communicatively coupled to the at least one processor and configured to load yarn packages onto a stalk subassembly, wherein the at least one processor is configured to selectively direct each automated guided vehicle to engage a respective stalk subassembly, and wherein, upon engagement between the automated guided vehicle and the stalk subassembly, the processor is configured to selectively direct the automated guided vehicle to move about and between the selected operative position within the creel assembly and a loading position proximate the automated creel loading assembly.

Aspect 2: The system of aspect 1, wherein the automated creel loading assembly comprises a multi-axis robot.

Aspect 3: The system of any one of the preceding aspects, wherein the automated creel loading assembly is configured to detect indicia provided on a yarn package positioned proximate the automated creel loading assembly, wherein the automated creel loading assembly is configured to transmit an identification signal to the at least one processor indicative of the detected indicia, and wherein the at least one processor is configured to identify the detected yarn package based upon the received identification signal.

Aspect 4: The system of any one of the preceding aspects, wherein if the identified yarn package corresponds to a desired yarn package type, the processor is configured to direct the automated creel loading assembly to load the identified yarn package onto a selected bullhorn of a stalk subassembly.

Aspect 5: The system of any one of the preceding aspects, further comprising at least one waste removal belt configured to direct yarn package waste away from the automated creel loading assembly.

Aspect 6: The system of any one of the preceding aspects, wherein the automated creel loading assembly is configured to remove yarn package waste from a stalk subassembly positioned in the loading position.

Aspect 7: The system of any one of the preceding aspects, wherein the automated creel loading assembly comprises at least one belt or conveyor configured to receive yarn packages proximate the multi-axis robot of the automated creel loading assembly.

Aspect 8: The system of any one of the preceding aspects, wherein each creel assembly comprises two stalk subassemblies.

Aspect 9: The system of any one of the preceding aspects, wherein the at least one creel assembly comprises a plurality of creel assemblies.

Aspect 10: The system of any one of the preceding aspects, wherein the at least one automated guided vehicle comprises a plurality of automated guided vehicles.

Aspect 11: The system of any one of the preceding aspects, wherein the plurality of creel assemblies are distributed among two stories.

Aspect 12: The system of any one of the preceding aspects, further comprising at least one elevator configured to permit selective movement of the stalk subassemblies and the automated guided vehicles among the two stories of creel assemblies.

Aspect 13: The system of any one of the preceding aspects, wherein the automated creel loading assembly is configured to load yarn packages onto stalk subassemblies positioned in a loading position on either of the two stories of creel assemblies.

Aspect 14: The system of any one of the preceding aspects, wherein the processor is configured to receive an input indicative of an empty stalk subassembly, and wherein the processor is configured to direct an automated guided vehicle to engage the empty stalk subassembly and to position the empty stalk subassembly in a loading position proximate the automated creel loading assembly.

Aspect 15: The system of any one of the preceding aspects, wherein each automated guided vehicle comprises wheels.

Aspect 16: A method of loading and delivering yarn packages to a desired location using the system of any one of the preceding aspects, comprising using the at least one processor to: instruct an automated creel loading assembly to load yarn packages onto a stalk subassembly; instruct an automated guided vehicle to engage the stalk subassembly; and instruct the automated guided vehicle to deliver the stalk subassembly to a selected operative position within the creel assembly.

Aspect 17: The method of aspect 16, further comprising, prior to delivery of the loaded stalk subassembly to the selected operative position, using the at least one processor to: receive an input indicative of an empty stalk subassembly; and instruct an automated guided vehicle to engage the empty stalk subassembly and remove the empty stalk subassembly from the creel assembly, wherein the selected operative position corresponds to a previous location of the empty stalk subassembly within the creel assembly.

Aspect 18: The method of any one of the preceding aspects, further comprising, using the at least one processor to: instruct the automated creel loading assembly to detect indicia provided on a yarn package positioned proximate the automated creel loading assembly; receive an identification signal indicative of the detected indicia; and identify the detected yarn package based upon the received identification signal.

Aspect 19: The method of aspect 18, further comprising, using the at least one processor to instruct the automated creel loading assembly to load the identified yarn package onto a selected bullhorn of a stalk subassembly if the identified yarn package corresponds to a desired yarn package type.

Aspect 20: A system comprising: at least one processor; a creel assembly having a plurality of bullhorns configured to engage respective yarn packages; an automated guided vehicle communicatively coupled to the at least one processor, wherein the automated guided vehicle comprises: a base portion; an automated creel loading assembly positioned on the base portion and being communicatively coupled to the at least one processor; and at least one yarn package storage assembly positioned on the base portion and defining a plurality of engagement elements that are configured to securely engage respective yarn packages, wherein each yarn package storage assembly is selectively rotatable relative to a vertical axis to permit positioning of a selected engagement element in a desired position relative to the automated creel loading assembly, wherein the at least one processor is configured to direct movement of the automated guided vehicle to a desired location relative to the creel assembly, and wherein the at least one processor is configured to direct the automated creel loading assembly to remove selected yarn packages from the at least one yarn package storage assembly and position the selected yarn packages in engagement with selected bullhorns of the creel assembly.

Aspect 21: The system of aspect 20, wherein the automated creel loading assembly comprises a multi-axis robot.

Aspect 22: The system of any one of the preceding aspects, further comprising an automated vehicle loading assembly communicatively coupled to the at least one processor, wherein the at least one processor is configured to direct the automated vehicle loading assembly to load yarn packages onto a yarn package storage assembly.

Aspect 23: The system of any one of the preceding aspects, wherein the automated vehicle loading assembly is configured to load yarn packages on a yarn package storage assembly positioned on an automated guided vehicle.

Aspect 24: The system of any one of the preceding aspects, wherein the automated vehicle loading assembly comprises a multi-axis robot.

Aspect 25: The system of aspect 24, wherein the automated vehicle loading assembly further comprises at least one belt or conveyor configured to receive at least one yarn package proximate the multi-axis robot.

Aspect 26: The system of any one of the preceding aspects, wherein the automated creel loading assembly is configured to detect indicia provided on each yarn package engaged by the at least one yarn package storage assembly, wherein the automated creel loading assembly is configured to transmit an identification signal to the at least one processor indicative of the detected indicia, and wherein the at least one processor is configured to identify the detected yarn package based upon the received identification signal.

Aspect 27: The system of any one of the preceding aspects, wherein if the identified yarn package corresponds to a desired yarn package type, the at least one processor is configured to direct the automated creel loading assembly to load the identified yarn package onto a selected bullhorn of the creel assembly.

Aspect 28: The system of any one of the preceding aspects, further comprising at least one rotational actuator, wherein each rotational actuator is communicatively coupled to the at least one processor and configured to effect selective rotational movement of a respective yarn package storage assembly, and wherein the processor is configured to selectively activate the at least one actuator to control rotation of the at least one yarn package storage assembly until the automated creel loading assembly detects a yarn package corresponding to a desired yarn package type.

Aspect 29: The system of any one of the preceding aspects, wherein the automated creel loading assembly is configured to remove yarn package waste from the creel assembly and position the yarn package waste within a yarn package storage assembly.

Aspect 30: The system of any one of the preceding aspects, wherein the processor is configured to receive an input indicative of an empty bullhorn, and wherein the processor is configured to direct an automated guided vehicle to position the automated creel loading assembly in a loading position proximate the empty bullhorn.

Aspect 31: The system of any one of the preceding aspects, wherein the automated guided vehicle comprises wheels.

Aspect 32: A method of using the system of any one of the preceding aspects, comprising using the at least one processor to: instruct an automated guided vehicle to position an automated creel loading assembly in a loading position proximate the creel assembly; and instruct the automated creel loading assembly to load yarn packages onto a selected bullhorn of the creel assembly.

Aspect 33: The method of aspect 32, further comprising: prior to positioning the automated creel loading assembly in the loading position, using the at least one processor to receive an input indicative of an empty bullhorn; and following positioning the automated creel loading assembly in the loading position, using the at least one processor to instruct the automated creel loading assembly to remove yarn package waste from the empty bullhorn, wherein the loading position corresponds to a location of the empty bullhorn within the creel assembly.

What is claimed is:

1. A system comprising:
    at least one processor;
    at least one automated guided vehicle communicatively coupled to the at least one processor;
    at least one creel assembly, each creel assembly having at least one stalk subassembly, each stalk subassembly being configured for selective secure engagement with an automated guided vehicle of the at least one automated guided vehicle and being configured for positioning by the automated guided vehicle in a selected operative position within the creel assembly, wherein each stalk subassembly comprises:
        a base portion;
        a stalk extending upwardly from the base portion relative to a vertical axis; and
        a plurality of bullhorns extending outwardly from the stalk and spaced apart relative to the vertical axis, wherein each bullhorn is configured to engage a respective yarn package; and
    an automated creel loading assembly communicatively coupled to the at least one processor and configured to load yarn packages onto a stalk subassembly,
    wherein the at least one processor is configured to selectively direct each automated guided vehicle to engage a respective stalk subassembly,
    wherein, upon engagement between the automated guided vehicle and the stalk subassembly, the processor is configured to selectively direct the automated guided vehicle to move about and between the selected operative position within the creel assembly and a loading position proximate the automated creel loading assembly,
    wherein the at least one processor is configured to receive an input indicative of an empty stalk subassembly, and
    wherein the processor is configured to direct an automated guided vehicle to engage the empty stalk subassembly and to transport the empty stalk subassembly to a loading position proximate the automated creel loading assembly, wherein the loading position is different than the selected operative position.

2. The system of claim 1, wherein each creel assembly comprises two stalk subassemblies.

3. The system of claim 1, wherein each automated guided vehicle comprises wheels.

4. The system of claim 1, further comprising at least one waste removal belt configured to direct yarn package waste away from the automated creel loading assembly.

5. The system of claim 4, wherein the automated creel loading assembly is configured to remove yarn package waste from a stalk subassembly positioned in the loading position.

6. The system of claim 1, wherein the automated creel loading assembly comprises a multi-axis robot.

7. The system of claim 6, wherein the automated creel loading assembly is configured to detect indicia provided on a yarn package positioned proximate the automated creel loading assembly, wherein the automated creel loading assembly is configured to transmit an identification signal to the at least one processor indicative of the detected indicia, and wherein the at least one processor is configured to identify the detected yarn package based upon the received identification signal.

8. The system of claim 7, wherein if the identified yarn package corresponds to a desired yarn package type, the processor is configured to direct the automated creel loading assembly to load the identified yarn package onto a selected bullhorn of a stalk subassembly.

9. The system of claim 7, wherein the automated creel loading assembly further comprises at least one belt or conveyor configured to receive yarn packages proximate the multi-axis robot of the automated creel loading assembly.

10. The system of claim 1, wherein the at least one creel assembly comprises a plurality of creel assemblies.

11. The system of claim 10, wherein the at least one automated guided vehicle comprises a plurality of automated guided vehicles.

12. The system of claim 11, wherein the plurality of creel assemblies are distributed among two stories.

13. The system of claim 12, further comprising at least one elevator configured to permit selective movement of the stalk subassemblies and the automated guided vehicles among the two stories of creel assemblies.

14. The system of claim 12, wherein the automated creel loading assembly is configured to load yarn packages onto stalk subassemblies positioned in a loading position on either of the two stories of creel assemblies.

15. A method of loading and delivering yarn packages to a desired location within a creel assembly, the method comprising:
    using at least one processor to instruct an automated creel loading assembly to load yarn packages onto a stalk subassembly in a loading position, the stalk subassembly comprising:
        a base portion;
        a stalk extending upwardly from the base portion relative to a vertical axis; and
        a plurality of bullhorns extending outwardly from the stalk and spaced apart relative to the vertical axis, wherein each bullhorn engages a respective yarn package loaded by the automated creel loading assembly;
    using the at least one processor to instruct an automated guided vehicle to engage the stalk subassembly; and
    using the at least one processor to instruct the automated guided vehicle to deliver the stalk subassembly to a selected operative position within the creel assembly, wherein the selected operative position is different than the loading position,
    wherein, prior to delivery of the loaded stalk subassembly to the selected operative position, the processor:
        receives an input indicative of an empty stalk subassembly; and
        instructs an automated guided vehicle to engage the empty stalk subassembly and remove the empty stalk subassembly from the creel assembly,
    wherein the selected operative position of the loaded stalk assembly corresponds to a previous location of the empty stalk subassembly within the creel assembly.

16. The method of claim 15, further comprising, using the at least one processor to:
- instruct the automated creel loading assembly to detect indicia provided on a yarn package positioned proximate the automated creel loading assembly;
- receive an identification signal indicative of the detected indicia; and
- identify the detected yarn package based upon the received identification signal.

17. The method of claim 16, further comprising, using the at least one processor to instruct the automated creel loading assembly to load the identified yarn package onto a selected bullhorn of a stalk subassembly if the identified yarn package corresponds to a desired yarn package type.

18. A system comprising:
- at least one processor;
- a creel assembly having a plurality of bullhorns configured to engage respective yarn packages;
- an automated guided vehicle communicatively coupled to the at least one processor, wherein the automated guided vehicle comprises:
  - a base portion;
  - an automated creel loading assembly positioned on the base portion and being communicatively coupled to the at least one processor;
- at least one yarn package storage assembly positioned on the base portion and defining a plurality of engagement elements that are configured to securely engage respective yarn packages; and
- at least one rotational actuator communicatively coupled to the at least one processor and configured to effect selective rotational movement of a respective yarn package storage assembly such that selected yarn packages within the at least one yarn package storage assembly are in an accessible position relative to the automated creel loading assembly,
- wherein the at least one processor is configured to direct movement of the automated guided vehicle to a desired location relative to the creel assembly, and
- wherein the at least one processor is configured to direct the automated creel loading assembly to remove selected yarn packages from the at least one yarn package storage assembly and position the selected yarn packages in engagement with selected bullhorns of the creel assembly.

* * * * *